No. 742,827. PATENTED NOV. 3, 1903.
F. D. BOYNTON.
COMPLETE SCHOOL RECORD CARD.
APPLICATION FILED AUG. 16, 1902.
NO MODEL. 2 SHEETS—SHEET 1.

Fig. 1.

WITNESSES:
W. F. Doyle

INVENTOR
Frank D. Boynton,
BY Theodore K. Bryant, Attorney

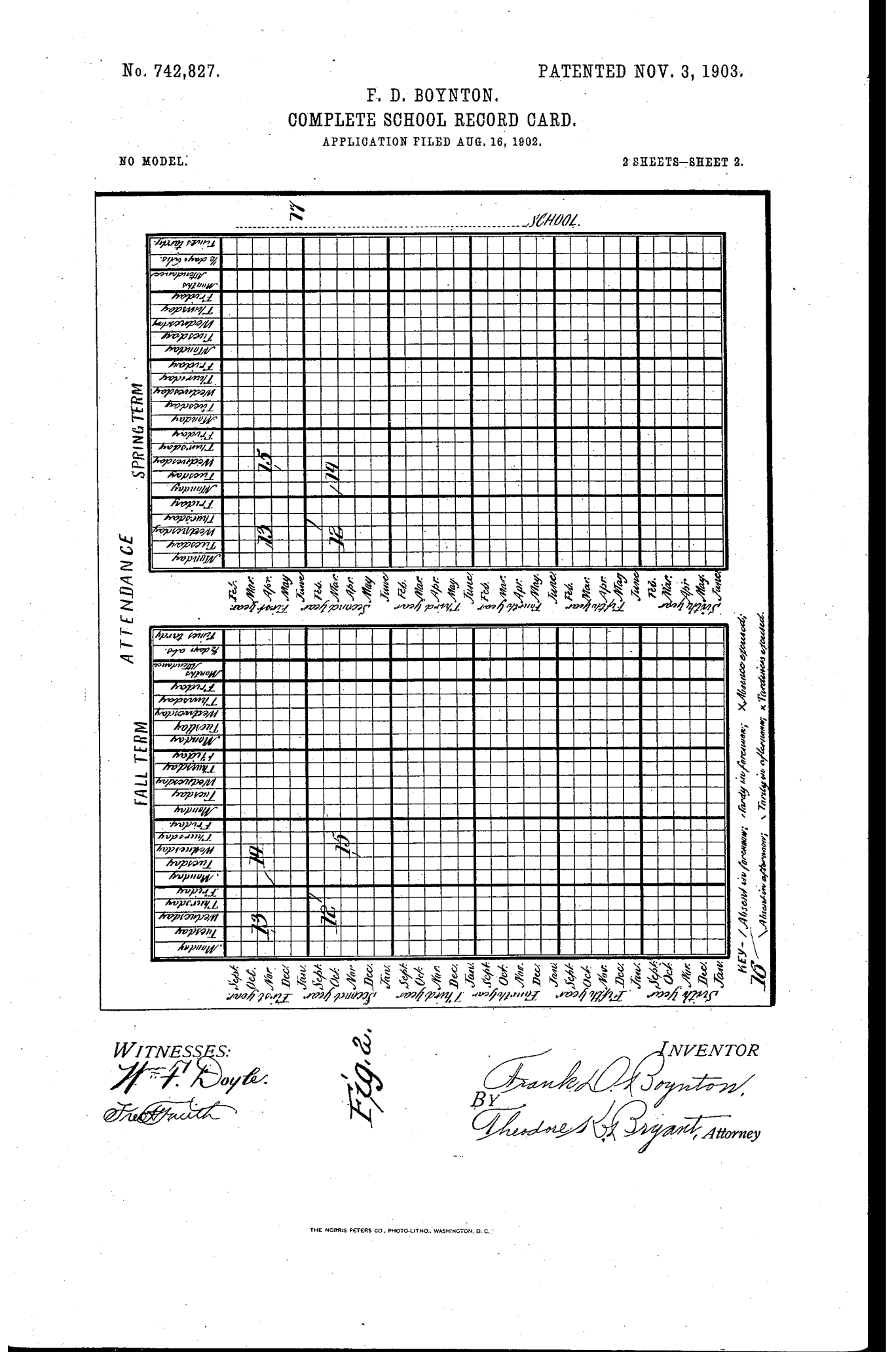

No. 742,827. PATENTED NOV. 3, 1903.
F. D. BOYNTON.
COMPLETE SCHOOL RECORD CARD.
APPLICATION FILED AUG. 16, 1902.
NO MODEL. 2 SHEETS—SHEET 2.

Fig. 2.

WITNESSES:
Wm. F. Doyle
Fred H. Faith

INVENTOR
Frank D. Boynton
BY Theodore K. Bryant, Attorney

No. 742,827. Patented November 3, 1903.

UNITED STATES PATENT OFFICE.

FRANK D. BOYNTON, OF ITHACA, NEW YORK.

COMPLETE SCHOOL-RECORD CARD.

SPECIFICATION forming part of Letters Patent No. 742,827, dated November 3, 1903.

Application filed August 16, 1902. Serial No. 119,873. (No model.)

*To all whom it may concern:*

Be it known that I, FRANK D. BOYNTON, a citizen of the United States of America, residing at Ithaca, in the county of Tompkins and State of New York, have invented certain new and useful Improvements in Complete School-Record Cards, of which the following is a specification.

This invention relates to improvements in school-records.

The object of the present invention is the provision of a novel form of record for schools designed to supplant the ordinary form of record-book commonly employed, and one which is so arranged that the entire record of a student, both as to scholarship and attendance, may be compactly maintained to the smallest detail, so that the standing of the student through his or her entire school life may be determined at a glance.

A further object of the present invention is to provide a record which is less expensive than those now commonly used and by the employment of which much time may be saved in entering the standing of a student and maintaining the same from time to time.

A further object of the invention is the provision of a school-record in which may be embodied a complete notation of a student's standing in scholarship, attendance, and final markings, one which may be easily maintained, and one which may be expeditiously filed away in any card-index for convenient reference when occasion arises.

With these general objects in view and others which will appear as the nature of the improvements is better understood the invention consists in a record substantially as hereinafter more fully described, illustrated in the accompanying drawings, and pointed out in the appended claims.

In the drawings, Figure 1 is a front elevation of a school-record embodying the herein-described invention and illustrating that portion designed for the scholarship-record. Fig. 2 is a rear elevation thereof and illustrating that portion designed for the record of attendance.

The present invention is designed to be filed in any card-index of ordinary form and construction; and to this end the invention is usually embodied in the form of a card which constitutes the permanent record, while copies of the card may be printed upon paper in order to furnish the students with a complete record precisely the same as that preserved by the school.

Referring to the drawings, the numeral 1 designates a card, the front face of which is shown in Fig. 1 and which face is designed to receive the scholarship-record of the student. This face of the card is divided into suitable spaces for such, and it will be observed that the top portion thereof is provided with a personal description of the student, (designated by the numeral 2,) immediately adjacent to which is a description of the certificates and diplomas received by the student and designated by the numeral 3 during his life at the school. Below the personal descriptions of the student and his life at the school the card is divided into what is properly the scholarship-record, and this is designated by the heading "Class standing," which is arranged at the top of a space embodying at its left-hand margin a vertically-arranged series of the studies or subjects pursued during the course at the school, this being designated by the numeral 4. These subjects are arranged in the natural divisions or in the order in which they are pursued through the medium of heavy lines 5, arranged in a horizontal manner, and the space devoted to the class standing is further divided by a heavy vertical line 6 into the terms in which the scholastic year is divided, in the present instance the space being divided into fall and spring terms, as shown. The space devoted to each term is in turn subdivided by light vertical lines 7 into spaces for the respective months of the terms, the designation of which months appears at the head of each column, and such subdivisions are further subdivided by the horizontal lines 8 in order that the record of each subject for the respective months of the terms may be kept. The horizontal spaces formed by the lines 8 are therefore in the same planes with the subjects, so that the record for each subject during each month may be readily entered opposite the respective subjects. At the right-hand margin of the space devoted to the class standing is a vertically-arranged series of spaces 9 for the entry of the year in which the subject was taken, and at the left-hand margin and in advance of the column of subjects or studies pursued is a vertically-arranged series of spaces 10, in which the final markings may be made. This column is also designed to embody the State regents' marks.

In order that the proper credit may be given for each subject and for the further purpose of indicating the length of time allotted to each subject, an indicating-symbol 11, in the present case a numeral, is placed in advance of each subject, and each of these symbols indicates the relative value of the marks in the respective subjects or studies. Each unit of each symbol also stands for ten weeks of school-work, and consequently by simply multiplying each of the indicating-numerals by ten will give the entire period of work over which the subject has extended. These indicating-symbols also give the number of counts or merits allowed for each subject by the State regents or board of education. For instance, the subject of English pursued in the first year counts four in the markings of the State regents or board of education and at the same time indicates that forty weeks of study have been allotted to this particular subject.

In the present case it will be observed that the card is divided into two spaces for the class standing. This is made necessary by the large number of subjects usually pursued to cover the entire course at a school; but it is obvious that if the course of study is such as to cover a shorter period than that for which the illustrated card is designed the space will of course be reduced. Each series of subjects may also be provided with blank spaces at the bottom in order that any additional subjects or special studies may be entered thereon, according to the needs of the particular institution using the record.

On the reverse face of the card is arranged the record for attendance, and this is illustrated in Fig. 2. This record is divided into spaces designated by the respective terms of each year, and each of these spaces is in turn divided by heavy horizontal lines 12 to provide spaces for the various years comprehending the entire course. These spaces are in turn subdivided by light horizontal lines 13 to provide spaces for the respective months of each term in the various years, and through the medium of heavy vertical lines 14, which intersect the lines 12 and 13, the spaces for the months and years are divided into weeks, which spaces are in turn again divided by the light vertical lines 15 into the school days of each week, the days designating each column being arranged at the top thereof. At the right-hand margin of each of the spaces for the respective terms is arranged a vertical series of spaces to denote the total attendance for each month, the period of absence, and the times tardy, and in order that the respective markings may be made a key of suitable arrangement is located at the bottom of the card, as indicated at 16, which key is employed for denoting the absence and tardiness, whether in the forenoon or afternoon, and also for the absence and tardiness which have been excused. The right-hand margin of the attendance-record may also be provided with a space, as at 17, to denote the school in which the record is used.

From the foregoing it will be seen that the herein-described invention provides a record in which may be embodied a student's standing from the time he commences his or her scholastic life until the end thereof, and the same also includes the record of attendance during such life. The invention is designed to supplant the ordinary form of record-books now commonly used, and the record is kept in compact form to the smallest detail. Hence the standing of a student at any point during the entire life at the institution may be determined at a glance. A record of the character described may be conveniently filed away in any form of card-index and is therefore convenient of access at all times, and the same may be produced at a minimum figure, and when once commenced it is entirely unnecessary to adopt other means for the preservation of the records of the various students.

Having thus described the invention, what is claimed as new, and desired to be secured by Letters Patent, is—

1. A record of the class described, comprising a surface subdivided into spaces having identifying data therein to designate the personal description of a student and class standing and attendance, the space designating the class standing comprising subdivisions defined by heavy lines and containing data indicative of the terms of a scholastic year, said term-spaces being subdivided into spaces defined by light lines and containing data indicative of the respective months constituting the terms, a series of subjects arranged opposite the subdivisions under the respective terms, said series of subjects being divided by heavy horizontal lines into groups comprising the natural divisions or courses in which the same are pursued, and an indicating-symbol arranged opposite each subject and designating both the counts or merits for each subject and a determinate period of time over which the respective studies extend.

2. A record of the class described, comprising a surface divided into spaces and having data indicative of the terms constituting a scholastic year, each of said term-spaces being subdivided into spaces having data indicative of the years comprehending an entire course, said year-spaces being subdivided into spaces having data at their sides indicative of the months of the year, and at one of their ends other data indicative of the days of the month, said term-spaces being further
5 subdivided to provide spaces having data indicative of the total attendance during the respective months.

In testimony whereof I hereunto affix my signature in presence of two witnesses.

FRANK D. BOYNTON.

Witnesses:
 J. E. WILLIAMS,
 CLARENCE D. TARBELL.